US011512175B2

(12) United States Patent
Rizzi et al.

(10) Patent No.: US 11,512,175 B2
(45) Date of Patent: Nov. 29, 2022

(54) POLYURETHANE FILM COMPRISING GRAPHENE AND PREPARATION PROCESS THEREOF

(71) Applicant: DIRECTA TEXTILE SOLUTIONS S.R.L., Lomazzo (IT)

(72) Inventors: Laura Giorgia Rizzi, Saronno (IT); Aldo Ciarleglio, Casnate con Bernate (IT); Giulio Giuseppe Cesareo, Como (IT); Ambrogio Donghi, Pusiano (IT)

(73) Assignee: Directa Textile Solutions S.r.L., Lomazzo (IT)

( * ) Notice: Subject to any disclaimer, the term of this patent is extended or adjusted under 35 U.S.C. 154(b) by 444 days.

(21) Appl. No.: 16/610,982

(22) PCT Filed: May 3, 2018

(86) PCT No.: PCT/EP2018/061291
§ 371 (c)(1),
(2) Date: Nov. 5, 2019

(87) PCT Pub. No.: WO2018/202747
PCT Pub. Date: Nov. 8, 2018

(65) Prior Publication Data
US 2020/0062914 A1 Feb. 27, 2020

(30) Foreign Application Priority Data
May 5, 2017 (IT) .................. 102017000049033

(51) Int. Cl.
C08J 5/18 (2006.01)
C08K 3/04 (2006.01)
C09J 7/25 (2018.01)
C09J 7/29 (2018.01)
C09J 7/35 (2018.01)
B29C 41/00 (2006.01)
B32B 27/08 (2006.01)
B32B 27/18 (2006.01)
B32B 27/32 (2006.01)
B32B 27/40 (2006.01)
B32B 37/10 (2006.01)
C08K 3/36 (2006.01)
C09J 11/04 (2006.01)
B29K 75/00 (2006.01)
B29K 105/16 (2006.01)
B29K 507/04 (2006.01)
B29L 7/00 (2006.01)
B82Y 30/00 (2011.01)
B82Y 40/00 (2011.01)

(52) U.S. Cl.
CPC .............. C08J 5/18 (2013.01); B29C 41/003 (2013.01); B32B 27/08 (2013.01); B32B 27/18 (2013.01); B32B 27/322 (2013.01); B32B 27/40 (2013.01); B32B 37/10 (2013.01); C08K 3/042 (2017.05); C08K 3/36 (2013.01); C09J 7/25 (2018.01); C09J 7/29 (2018.01); C09J 7/35 (2018.01); C09J 11/04 (2013.01); B29K 2075/00 (2013.01); B29K 2105/162 (2013.01); B29K 2507/04 (2013.01); B29L 2007/008 (2013.01); B32B 2264/108 (2013.01); B32B 2405/00 (2013.01); B82Y 30/00 (2013.01); B82Y 40/00 (2013.01); C08J 2327/18 (2013.01); C08J 2375/04 (2013.01); C08K 2201/003 (2013.01); C08K 2201/004 (2013.01); C08K 2201/011 (2013.01); C09J 2301/41 (2020.08); C09J 2427/006 (2013.01); C09J 2475/006 (2013.01)

(58) Field of Classification Search
CPC ....... C08J 5/18; C09J 11/04; C09J 7/25; C09J 7/29; C09J 7/35; C08K 3/042; C08K 3/36; B82Y 30/00; B32B 27/08; B32B 27/18; B32B 27/40; B32B 27/322; B32B 37/10; B29C 41/003
USPC ...................................... 428/423.1
See application file for complete search history.

(56) References Cited

U.S. PATENT DOCUMENTS

2017/0103826 A1* 4/2017 Al-Harthi .................. C08J 5/18
2017/0190583 A1* 7/2017 Cesareo .................. C01B 32/19

FOREIGN PATENT DOCUMENTS

| CN | 10147897 A | 7/2009 |
| CN | 104163928 A | 11/2014 |
| CN | 104530686 A | 4/2015 |
| CN | 105199366 A | 12/2015 |
| CN | 106589903 A | 4/2017 |
| WO | 2014198752 A1 | 12/2014 |
| WO | 2015193268 A1 | 12/2015 |

(Continued)

OTHER PUBLICATIONS

Translation of Abstract of CN 106142784, Nov. 23, 2016. (Year: 2016).*
Folke Johannes Tolle et al: "Emulsifier-Free Graphene Dispersions with High Graphene Content for Printed Electronics and Freestanding Graphene Films", Advanced Functional Materials, Wiley-V C H Verlag GMBH & Co. KGAA, DE, vol. 22, No. 6, Mar. 21, 2012 (Mar. 21, 2012), pp. 1136-1144, XP001573639, ISSN: 1616-301X, DOI: 10.1002/ADFM.201102888 [retrieved on 20-12-01-26].

(Continued)

Primary Examiner — Hui H Chin
(74) Attorney, Agent, or Firm — Patterson Intellectual Property Law, P.C.

(57) ABSTRACT

A polyurethane film comprising a polyurethane resin and graphene, wherein the graphene is present in an amount of 1 to 30% by weight on the total weight of the film and consists of graphene nano-platelets, wherein at least 90% has a lateral dimension (x, y) of 50 to 50000 nm and a thickness (z) of 0.34 to 50 nm, wherein the lateral dimension is always greater than the thickness (x, y>z), wherein the C/O ratio is ≥100:1, and a preparation process thereof.

15 Claims, 1 Drawing Sheet

(56) References Cited

FOREIGN PATENT DOCUMENTS

| WO | 2017037642 A1 | 3/2017 | |
|---|---|---|---|
| WO | WO-2017037642 A1 * | 3/2017 | ............... A43B 7/34 |

OTHER PUBLICATIONS

Pei Songfeng et al.: "The reduction of graphene oxide", Carbon, vol. 50, No. 9, Nov. 16, 2011 (Nov. 16, 2011) pp. 3210-3228, XP028915234, ISSN: 0008-6223, DOI: 10.1016/J.CARBON.2011.11.010.
International Searching Authority: PCT/EP2018/061291, dated Jul. 24, 2018 (Jul. 24, 2018).
China National Intellectual Property Adinistration: Notification of the First Office Action for corresponding Application No. N201880028820.8 dated Sep. 8, 2021, 11 pages.

\* cited by examiner

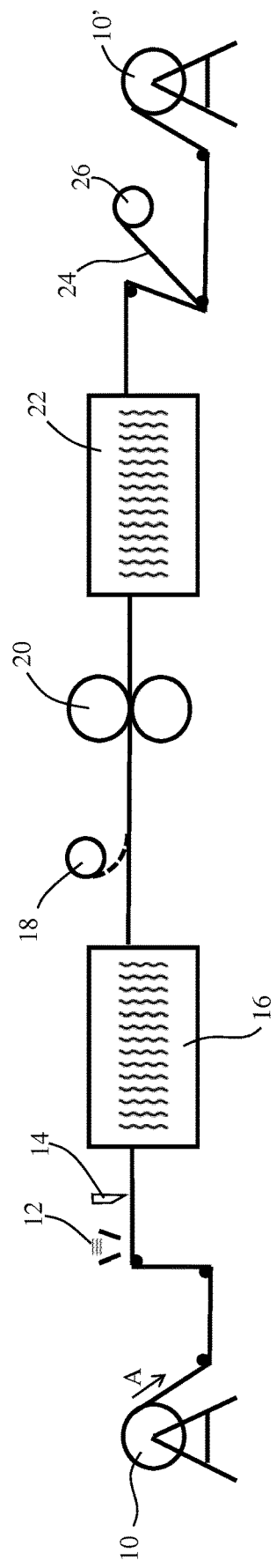

POLYURETHANE FILM COMPRISING GRAPHENE AND PREPARATION PROCESS THEREOF

The present invention refers to a polyurethane film comprising graphene and to its preparation process.

BACKGROUND OF THE INVENTION

Films or polymer membranes are known containing graphene, if necessary coupled with other films or textile substrates, in the production of articles, the properties and performance of which can be improved by the presence of a suitable amount of graphene. In fact, graphene can improve, for example, the thermal and electrical conductivity of the film, and therefore make the use of said films advantageous in the production of articles in various product sectors, for example in the sector of clothing, furnishing and in the industrial world.

From the patent literature, polymer compositions are known comprising graphene for the production of films and articles comprising said films.

CN 105504773 (A) describes a conductive polyurethane film, containing 1 to 10 parts by weight of graphene, obtained by a process that requires premixing of the graphene with a part of the polyurethane and subsequent mixing with the rest of the polyurethane. The mixing is carried out at a high rotation speed (800 to 8000 r.p.m.) in a machine adapted to produce a high shear stress. The film obtained has an electrical conductivity of $10^3$-$10^5$ Ω.

WO 2017/037642 A1 describes a production process of a multilayer membrane of polyurethane containing graphene. More specifically, the membrane is formed of a layer of polyurethane without graphene (called "neutral") and a layer of polyurethane containing graphene, therefore rendered conductive. In a preferred embodiment, the conductive layer is provided with terminals for electrical connection to a battery adapted to apply a low voltage to the conductive layer and consequently heat the membrane. The document does not provide any indication of the polyurethane resin to be used to form the membrane or the graphene used. As regards the latter, it is not known whether it is pristine graphene or graphene oxide or modified graphene, and neither is any information provided concerning the morphology or dimensions of said graphene. Furthermore, no reference is made to the thermal conductivity or to the absorption in the infrared radiation field.

WO 2014/198752 A1 describes heatable molded articles made from electrically conductive thermoplastic polyurethanes comprising a conductivity-conferring additive selected from nanotubes, graphene and conductivity-grade carbon black. Carbon nanotubes are preferred.

As to graphene, high variability of C/O ratios are reported as suitable, e.g. from 3:1 to 500:1, and no limitation as to lateral dimensions is mentioned.

Tölle F. J. et al, "Emulsifier-Free Graphene Dispersions with High Graphene Content for Printed Electronics and Freestanding Graphene Films" Adv. Funct. Mater. 2012, 22, 1136-1144, describe dispersions of graphene oxide (GO) in water, with an oxygen content of from 4 to 16 wt %. When the oxygen content is 4 wt % or less, however, attempts to disperse thermally reduced GO in water failed.

The need is therefore felt for a polyurethane film containing graphene which has better characteristics than the known films and can therefore be advantageously used in the production of articles having better performance than the known articles.

The need is also felt to provide said improved polyurethane film containing graphene by means of a simple effective production process.

SUMMARY OF THE INVENTION

One object of the present invention is therefore to provide a polyurethane film comprising graphene that has improved characteristics with respect to those of the known films containing graphene, and can therefore be advantageously used in the production of articles having better performance than the known articles, for example in the textile and clothing sector.

A further object of the present invention is to provide a preparation process of a polyurethane film comprising graphene which is simple and effective.

One aspect of the present invention therefore concerns a polyurethane film comprising a polyurethane resin and graphene, characterized in that said graphene is present in an amount of 1 to 30% by weight on the total weight of the film, and that said graphene consists of nano-platelets of graphene, in which at least 90% has a lateral dimension (x, y) of 50 to 50000 nm and a thickness (z) of 0.34 to 50 nm, in which the lateral dimension is always greater than the thickness (x, y>z), and in which the ratio C/O is ≥100:1.

According to a preferred aspect, the polyurethane film also comprises 0.1 to 5% by weight of an antiblocking additive on the total weight of the film.

In one embodiment, the polyurethane film is a multilayer film comprising at least two coupled layers, at least one of which consists of a polyurethane film comprising graphene as defined above. The other film can be again a polyurethane film comprising or not comprising graphene, or a film consisting of a polymer—or a mixture of polymers—different from polyurethane, not comprising graphene.

Another aspect of the present invention concerns a process for the preparation of a polyurethane film comprising graphene, comprising the steps of:

(A) Preparing a composition comprising:
   a1) a polyurethane resin or precursors thereof,
   a2) 0.1 to 5% by weight of an antiblocking additive,
   a3) 1 to 30% by weight of graphene consisting of nano-platelets of graphene, in which at least 90% has a lateral dimension (x, y) of 50 to 50000 nm and a thickness (z) of 0.34 to 50 nm, in which the lateral dimension is always greater than the thickness (x, y>z), and in which the C/O ratio is ≥100:1;

(B) Adjusting the viscosity of the composition of step (A) by adding a solvent until obtaining a viscosity in the range of 4000 to 15000 cPs;

(C) Applying the composition having the viscosity of step (B) on a flat support until forming a layer having a thickness of 10 to 100 μm;

(D) Heating said layer to an increasing temperature of 30 to 180° C., with formation of a polyurethane film;

(E) Detaching said polyurethane film from said support.

In one embodiment, the process according to the invention comprises coupling of the polyurethane film prepared according to steps (A) to (D) with at least one other layer or film of resin, carrying out intermediate steps of coupling ($D_1$) and heating ($D_2$), obtaining a multilayer film, and subsequent step (E) of detaching the multilayer film from the support.

DESCRIPTION OF THE INVENTION

The polyurethane film according to the invention comprises a polyurethane resin and graphene in an amount of 1 to 30% by weight on the total weight of the film.

Preferably the graphene is present in an amount of 2 to 25% by weight on the total weight of the film, more preferably between 3 and 15%.

The graphene consists of nano-platelets of graphene, in which at least 90% has a lateral dimension (x, y) of 50 to 50000 nm and a thickness (z) of 0.34 to 50 nm, in which the lateral dimension is always greater than the thickness (x, y>z), and in which the C/O ratio is ≥100:1.

In the polyurethane film according to the invention at least 90% of the graphene nano-platelets has preferably a lateral dimension (x, y) of from 100 to 25000 nm, more preferably from 500 and 15000 nm, and even more preferably from 800 to 10000 nm.

In the polyurethane film according to the invention at least 90% of the graphene nano-platelets has preferably a thickness (z) of from 0.34 to 20 nm, more preferably 0.34 to 8 nm.

Graphene is a material consisting of a monoatomic layer of carbon atoms hydridized in the form $sp^2$. They are therefore arranged in highly crystalline regular honeycomb structures with compact hexagonal packing.

From the scientific and patent literature, various methods are known for the preparation of graphene, such as chemical-vapour deposition, epitaxial growth, chemical exfoliation and chemical reduction of the oxidised form graphene oxide (GO).

The most common chemical methodology for the preparation of graphene involves the formation of graphene oxide under highly oxidizing conditions, which even after reduction, lacks the electronic quality of pristine graphene.

According to an aspect of the present invention, the graphene nano-platelets defined above are nano-platelets of pristine graphene, namely of graphene that has not been obtained by reduction of graphene oxide but by means of intercalation and expansion/exfoliation of graphite, and subsequent reduction of size.

The Applicant Directa Plus S.p.A. is holder of the European patent EP 2 038 209 B1 which describes, among other things, a method for the production of structures comprising layers of graphene obtained by means of intercalation and subsequent expansion/exfoliation of graphite.

The Applicant Directa Plus S.p.A. is also the holder of the international patent applications WO 2015/193267 A1 and WO 2015/193268 A1 which describe production methods of aqueous dispersions of highly pure graphene, from which it is possible to obtain nano-platelets of graphene with a C/O ratio ≥100:1, and also ≥200:1. This ratio is important since it defines the maximum amount of oxygen bound to the carbon constituting the graphene. In fact, the best properties of graphene, which derive from its high crystallographic quality, are obtained when the amount of oxygen is minimum.

A highly pure graphene, i.e. with a ratio C/O ≥100, an absence or minimum presence of lattice defects—verifiable by means of Raman spectroscopy—minimum or no presence of extraneous substances, including surface-active agents or graphene functionalizing or coupling agents, constitutes a fundamental component for improvement of the properties of the polyurethane film according to the invention.

The C/O ratio in the graphene used in the polyurethane film according to the invention is determined by means of elemental analysis performed by means of elemental analyzer (CHNS O), which provides the percentage by weight of the various elements. By normalizing the values obtained with respect to the atomic weight of the species C and O and acquiring the ratio, the C/O ratio is obtained.

It has been found that graphene in the oxidized form, like the one in the form obtained by reduction of graphene oxide (GO), has characteristics and properties different from pure grapheme (pristine graphene). For example, the electrical and thermal conductivity and mechanical strength of the pristine graphene are superior to those of the GO and to the reduction product obtained from it, also due to the presence of numerous lattice defects and imperfections in the crystalline structure caused by the reduction reaction.

The lattice defects of the nano-platelets can be evaluated by means of Raman spectroscopy, analysing intensity and form of the D-band positioned at 1350 $cm^{-1}$.

According to embodiments described in the above-mentioned patent documents of the Applicant Directa Plus S.p.A., the process for the production of pristine graphene is carried out in continuous mode, continuously feeding graphite flakes to the expansion step at high temperature, discharging the expanded graphite thus obtained into an aqueous medium in a continuous manner and continuously subjecting the expanded graphite dispersed in the aqueous medium to exfoliation treatment and dimensional reduction by means of ultrasonication and/or homogenization at high pressure.

This process for the production of pristine graphene comprises several steps.

The first step of the process consists in the preparation of expanded and/or exfoliated graphite from intercalated graphite.

The intercalated graphite can be prepared with methods known to a person skilled in the art or purchased on the market. The step of expansion of the intercalated graphite is carried out by subjecting graphite intercalation compounds (GICs) having a lateral dimension ≤500 μm to a temperature between 1300 and 12000° C. for less than 2 seconds. This treatment is carried out as described in the patent EP 2038209 B1, i.e. by generating heat in the GICs preferably by means of an electric arc, a microwave oven or high frequency induction oven or plasma forming oven. The latter treatment is particularly preferred due to the possibility of reaching the desired temperature associated with a high turbulence.

The second step of the process comprises the collection and dispersion in an aqueous medium of the expanded graphite obtained in the first step, immediately after the formation thereof.

Preferably the expanded graphite is dropped by gravity into a vessel containing an aqueous medium in the absence of surfactant or in the presence of a surfactant in an amount lower than 1% by weight with respect to the weight of said graphite.

The introduction of the expanded graphite just formed into an aqueous medium allows an optimal dispersion of the same to be obtained without the need to use a surfactant.

Obtaining an optimal aqueous dispersion of expanded graphite without the aid of surfactants represents an important advantage, in terms of both the lower cost due to the saving of surfactant, and in terms of the improved properties of the end product, as will be detailed further on in the description. A small amount of surfactant, however, lower than 1% by weight, can be used without over-compromising the quality of the end product.

If dispersion of the expanded graphite is carried out in the presence of a surfactant, the surfactant is preferably an anionic surfactant, more preferably an anionic surfactant in which the anion constituting the hydrophilic polar group is selected from sulphonate, sulphate and carboxylate, and the hydrophobic apolar part is selected from structures comprising aromatic rings such as benzene, naphthalene, pyrene or cyclic aliphatic structures such as the derivatives of cholic acid. A preferred surfactant is sodium benzenesulphonate.

The dispersion is obtained by means of gentle stirring.

The expanded graphite is dispersed in water at a concentration of 0.5% to 5% by weight, preferably 1% to 4% by weight, more preferably 2% to 3% by weight.

The third step of the process has the purpose of obtaining exfoliation of the expanded graphite and dimensional reduction thereof until obtaining nano-platelets of pristine graphene, at least 90% of which have a lateral dimension (x, y) of 50 to 50000 nm and thickness (z) of 0.34 to 50 nm, the lateral dimension being greater than the thickness (x, y>z).

This exfoliation and dimensional reduction is obtained by subjecting the dispersion of the graphite in water, in which there is no surfactant or there is an amount of surfactant lower than 1% by weight, to a treatment with ultrasounds or to a homogenization treatment at high pressure in which collisions between the particles of expanded graphite occur.

The ultrasound treatment is carried out at an energy level between 10 and 200 Wh per gram of expanded graphite obtained in the preceding step.

Preferably the ultrasound treatment of the aqueous dispersion of expanded graphite is carried out at an energy level between 10 and 100 Wh per gram. The ultrasound treatment is carried out using equipment such as commercial ultrasonicators for the treatment of liquids, where the acoustic energy is transmitted to the system by cavitation (formation and implosion of bubbles) by means of sonotrode immersed in the liquid, with wave frequency around 24 kHz, and power as defined above.

The combination of the expansion treatment of the intercalated graphite at high temperature and subsequent ultrasonication treatment in an aqueous medium allows both exfoliation of the graphite and dimensional reduction thereof, obtaining nano-platelets of graphene directly dispersed in water, in relatively short times.

The high pressure homogenization treatment is carried out with a homogenizer in which the dispersion of expanded graphite is pumped at a pressure higher than 35 MPa through one or more micro-channels or constrictions. Here the particles in dispersion are subject to very high shear stress, deriving from the sudden drop in pressure, and to collision between them and with the surfaces of the micro-channels or of the constrictions.

By the term "constriction" we mean a substantially point reduction of the cross section of the duct through which the dispersion is forced to flow, whereas by the term "micro-channel" we mean a constriction that extends in the particle dispersion flow direction.

Said treatment allows a substantial dimensional reduction of the expanded graphite to be obtained, up to values according to the axes x, y and z mentioned previously. Said constrictions can be either of static type, for example flow channels having a maximum dimension of 500 µm, or dynamic type, for example valves with adjustable section so as to define a constriction having a maximum dimension of 500 µm.

High pressure homogenization equipment using static type constrictions is marketed by Microfluidics International Corporation (Newton, Mass., U.S.A.) under the brand Microfluidizer®. In this equipment the dispersion of expanded graphite is pumped at a pressure higher than 35 MPa through a plurality of flow channels having a maximum dimension of 500 µm, in which the particles of expanded graphite are made to collide.

Preferably the maximum pressure is 500 MPa. The structure and operation of this equipment are also described in the U.S. Pat. No. 8,367,004 B2.

High pressure homogenization equipment using dynamic type constrictions are marketed by GEA NIRO-Soavi (Parma, Italy). The structure and operation of this equipment are also described in the U.S. Pat. No. 4,773,833.

According to the entity of the desired dimensional reduction, it is possible to treat the aqueous dispersion of expanded graphite in the homogenizer several times. This can be carried out in continuous mode, with various passages through the homogenizer.

Preferably the high pressure homogenization treatment is carried out in a homogenizer in which the dispersion of expanded graphite is pumped at a pressure higher than 100 MPa through one or more micro-channels or constrictions.

As previously mentioned, the final dispersion of the nano-platelets of graphene obtained after the exfoliation treatment and dimensional reduction performed with one or more of the methods defined above can be concentrated or dried, depending on the final form desired for the graphene.

The concentration of the dispersion can be carried out with techniques known to a person skilled in the art, for example removal of the water by evaporation, filtering or centrifugation.

The absence—or minimum presence (lower than 1%)—of the surfactant means that the problem of possible polymerization thereof can be avoided and higher operating temperatures can be used, in addition to guaranteeing feasibility of the liquid-solid separation.

By means of the techniques indicated above it is possible to increment the concentration of the dispersion up to 30% by weight. The product obtained in a concentration range of 6 to 30% by weight has a high viscosity and the consistency of a paste, and can be advantageously used as masterbatch for water-based formulations.

The advantages of the use of a dispersion concentrated in the range 6-30% by weight are: 1) freedom of formulation, i.e. possibility of diluting the product to the desired concentration and of selecting the best surfactant for the specific application; 2) high dispersibility due to the presence of the residual water which, interposed between the nano-platelets of graphene, weakens the Van der Waals type bonds established between the same; 3) possibility of using the product directly by application on the desired substrate; 4) containment of the nano-platelets of graphene in a matrix, with consequent ease of handling and transport.

One particularly advantageous method of concentration of the dispersion is that of filtering with removal of the water until obtaining above the filter a dispersion having a concentration in the desired range. The filtering system is regulated by adjusting the treatment time and the filtering pressure. The filters are defined on the basis of the filtering surface. An appropriate filtering system is the one marketed under the brand Funda® by Mavag AG.

Drying of the dispersion has the purpose of obtaining a dry powder which can be easily re-dispersed in different matrixes, both solvents and polymers, where the liquid is not desirable or cannot be managed at process level, or where the water cannot be used at the level of chemical compatibility.

The dispersion can be dried by means of known techniques, for example by means of freeze-drying, evaporation in rotating evaporator or spray drying. In all cases the graphene nano-platelets produced in the absence of surfactant show a high degree of dispersibility. Furthermore, on the one hand the low oxygen content and the absence of lattice defects guarantee high chemical-physical properties, and on the other guarantee the non-reagglomeration of the nano-platelets in a stable manner, due to a covalent type chemical interaction. The high aspect ratio (high lateral dimension and low thickness) guarantee optimal performance in terms of conductivity, both electrical and thermal, and barrier properties.

A very important advantage of the process described consists in the possibility of operating without surfactant. In fact, the graphene nano-platelets thus obtained have a very high purity, due both to the high C/O ratio and to the absence of extraneous substances which end up being contaminants, for example the surfactants. In fact, it has been verified that the absence of surfactants allows graphene to be obtained having an electrical conductivity substantially superior to that of the graphene obtained with the processes using surfactants. This improves the performance of the graphene in many applications.

The pristine graphene nano-platelets, at least 90% of which have a lateral dimension (x, y) of 50 to 50000 nm and a thickness (z) of 0.34 to 50 nm, the lateral dimension being greater than the thickness (x, y>z), with a C:O ratio ≥100:1, have a high electrical conductivity. The electrical conductivity is determined on a film obtained by deposition of an aqueous dispersion of said nano-platelets on a glass substrate forming a film of 1 cm×1 cm and dried by means of heating plate to 100° C. for 15 minutes, and is measured in Van der Pauw configuration. Said film has an electrical conductivity ≥1500 S/m, preferably ≥2000 S/m.

It has also been verified that when a dispersion of graphene nano-platelets forms in the presence of surfactant, the latter deposits on the surface of said platelets and tends to favour the agglomeration thereof.

In the present description the graphene nano-platelets are referred dimensionally to a system of Cartesian axes x, y, z, it being understood that the particles are substantially flat platelets but can also have an irregular shape. In any case, the lateral dimension and the thickness provided with reference to the directions x, y and z should be understood as the maximum dimensions in each of the above-mentioned directions.

The lateral dimensions (x, y) of the graphene nano-platelets are determined—in the ambit of the production process described above—with direct measurement under the scanning electron microscope (SEM), after diluting the final dispersion in a ratio 1:1000 in deionized water and having dripped it onto a substrate of silicon oxide arranged on a plate heated to 100° C.

Alternatively, with the nano-platelets in the dry state, the SEM analysis is performed directly on the powder deposited on a carbon tape. In both cases the measurement is performed on at least 100 nano-platelets.

The thickness (z) of the graphene nano-platelets is determined with the atomic force microscope (AFM), which is essentially a profilometer with subnanometric resolution, widely used for characterization (mainly morphological) of surfaces and nanomaterials. This type of analysis is commonly used to evaluate the thickness of the graphene flakes, produced in any way, and therefore identify the number of layers composing the flake (single layer=0.34 nm).

The final dispersion of nano-platelets is diluted in a ratio 1:1000 in isopropanol, 20 ml are then collected and sonicated in an ultrasound bath (Elmasonic S40) for 5 minutes. The nano-platelets are then deposited as described for the SEM analysis and are scanned directly with an AFM tip, where the measurement provides a topographical image of the grapheme flakes and their profile with respect to the substrate, permitting precise measurement of the thickness. The measurement is performed on at least 50 nano-platelets.

Alternatively, with the nano-platelets in the dry state, the powder is dispersed in isopropanol at a concentration of 2 mg/L. 20 ml are collected and sonicated in an ultrasound bath (Elmasonic S40) for 30 minutes. The nano-platelets are then deposited as described for the SEM analysis and are scanned by AFM.

In the concentrated final dispersion or in the dry form obtained after drying, at least 90% of the graphene nano-platelets has preferably a lateral dimension (x, y) of 100 to 25000 nm, more preferably between 500 and 15000 nm, and preferably a thickness (z) of 0.34 to 20 nm, more preferably 0.34 to 8 nm.

Graphene having the characteristics defined above is produced and marketed by the Applicant Directa Plus SpA, under the brand G+.

The graphene nano-platelets having the above-mentioned dimensional and purity characteristics, therefore having an extremely low oxygen level, as defined by the above-mentioned C:O ratio and not functionalized with other molecules, have proved particularly suitable for use as components of a polyurethane film, in which it is possible to obtain desired properties such as: i) high breathability; ii) high impermeability; iii) high resistance to abrasion; iv) increased thermal conductivity, useful for heat dissipation; v) increased electrical conductivity, useful for dissipation of electrostatic energy, for electrical heating and for data transmission; vi) antibacterial activity, useful for applications in the clothing and medical sector; vii) infrared absorption, useful for increasing the insulating power of the film.

With reference to the composition and to the preparation process of the polyurethane film according to the invention, in step (A) the component a1) consists of a polyurethane resin or precursors thereof. By this definition we mean a polyurethane resin that can be of the monocomponent type or having several components, which have to be mixed to result in formation of the polyurethane resin. When the component a1) is of the type with several components, they can comprise the catalyst and/or prepolymers as such or functionalized, as is known in the sector. The polyurethane can be aliphatic or aromatic.

According to a preferred aspect, the polyurethane film comprises as component a2) also 0.1 to 5% by weight of an antiblocking additive on the total weight of the film, preferably 0.2 to 1.5% by weight, more preferably 0.3 to 3% by weight. The antiblocking additive is preferably selected from silica, silicone and kaolin. The preferred unblocking additive is silica, which can be either in powder or in colloidal form, for example with a dimension of 0.5 μm. The antiblocking additive also gives the film an opaque appearance.

The composition used for preparation of the polyurethane film according to the invention can comprise other components in addition to the components a1), a2), a3) and the solvent of step B, such as additives, process agents, antioxidants, plasticizers, flow additives, as is known to an expert in the field of polyurethane films.

In one embodiment, the polyurethane film is a multilayer film comprising at least two coupled layers of polyurethane resin, at least one of which consists of a film comprising graphene as defined above. The other film can be again a polyurethane film comprising or not comprising graphene, or a film consisting of a polymer—or a mixture of polymers—different from polyurethane, not comprising graphene.

In the embodiment in which the film is of the multilayer type, the preparation process comprises coupling of the film produced by the process described above with another film, produced or available separately.

The invention will now be described also with reference to FIG. 1, which schematically illustrates the process according to the invention.

The process for the preparation of a polyurethane film according to the invention comprises the following steps:
(A) Prepare a composition comprising:
  a1) a polyurethane resin or precursors thereof,
  a2) 0.1 to 5% by weight of an antiblocking additive,
  a3) 1 to 30% by weight of graphene consisting of graphene nano-platelets, in which at least 90% has a lateral dimension (x, y) of 50 to 50000 nm and a thickness (z) of 0.34 to 50 nm, in which the lateral dimension is always greater than the thickness (x, y>z), and in which the C/O ratio is ≥100:1;
(B) Adjust the viscosity of the composition of step (A) by adding a solvent until obtaining a viscosity in the range from 4000 to 15000 cPs;
(C) Apply the composition having the viscosity of step (B) on a flat support until forming a layer having a thickness of 10 to 100 μm;
(D) Heat said layer to an increasing temperature between 30 and 180° C., with formation of a polyurethane film;
(E) Detach said polyurethane film from said support.

In step (A) the components a1), a2) and a3) are placed in a vessel provided with stirring system and mixed. Preferably a mechanical stirrer is used at a rotation speed of 100 to 2000 r.p.m., more preferably 150 to 100 r.p.m.

Preferably the composition of step (A) also comprises a flow additive (component a4).

The antiblocking additive a2) is as defined previously.

In step (B) the viscosity of the mixture of a1), a2) and a3) is adjusted with the addition of an organic solvent in the range between 4000 and 15000 cPs, preferably between 6000 and 12000 cPs. Examples of said solvent are dimethylformamide, toluene, acetone, ethyl acetate and dipropylene glycol methyl ether, marketed under the brand Dowanol® DPM by Dow Chemical.

The steps (C) to (E) are described with reference to FIG. 1.

In FIG. 1, the number 10 indicates a roll of paper adapted to constitute the support tape on which the composition prepared in steps (A) and (B) is applied, known in the sector as release paper or casting & release paper. This paper has non-adhesion characteristics, on which the polyurethane film is formed, and from which it can then be detached and separated, due to the non-adhesion characteristics and the particular surface finish of the paper.

In step (C) the roll of release paper 10 is unwound in the direction of the arrow A at an appropriate speed, for example between 3 and 30 m/min, and a controlled amount of composition prepared in steps (A) and (B) is deposited on the paper in continuous mode. The thickness of the layer thus formed is defined by adjusting the distance between the paper tape and a blade 14 positioned on top of it. Typical thicknesses are, for example, between 10 and 100 mμ.

In step (D) the paper tape on which the layer of polyurethane composition having the desired thickness has been deposited is introduced into an oven 16 and heated to an increasing temperature between 30 and 180° C., with formation of a polyurethane film.

In the following step (E) the film is detached from the release paper tape and wound on a roller, in a manner not illustrated in FIG. 1 but known to a person skilled in the art.

In the preparation of a multilayer film, the process comprises, after the heating step (D), coupling of the polyurethane film prepared according to steps (A) to (D) with at least one other resin layer or film 18, thus providing intermediate coupling ($D_1$) and heating ($D_2$) steps, obtaining a multilayer film, and subsequent step (E) of detaching the multilayer film from the support. The film 18 consists of a second polyurethane film not containing graphene, or a film consisting of a different resin, not comprising graphene. Suitable resins consist, for example, of polytetrafluoroethylene (PTFE), thermoplastic polyurethane (TPU), polyolefins (polypropylene, polyethylene), polyamide and polyester.

The thickness of the film 18 coupled to the polyurethane film comprising graphene is usually between 10 and 100 μm.

The film 18, wound on a roller, is unwound and laid on the polyurethane film coming out of the oven 16 and coupled to the same by passing through a calender 20, according to step ($D_1$). The bond consisting of the release paper+polyurethane film comprising graphene+second film is sent to a second oven 22, where it is heated to a temperature between 100 and 160° C., according to step ($D_2$).

At the outlet of the oven 22, step (E) is carried out, in which the release paper is separated and wound on a roll 10', while the two-layer film 24 consisting of the polyurethane film comprising graphene and the second film coupled to it is wound on a tape 26.

The monolayer or multilayer polyurethane film comprising graphene according to the invention shows properties superior to the known films, and can therefore be advantageously used for the production of articles in various technological sectors, such as the clothing sector, particularly clothing and sports equipment, footwear, workwear and wearable electronics, furnishing and the industrial sector.

In one embodiment, the film according to the invention is a three-layer film, one layer of which consists of the polyurethane film comprising graphene, another consists of a film not comprising graphene, and the third consists of a thermoadhesive material, also not comprising graphene.

In another embodiment, the film according to the invention is a two-layer film, one layer of which consists of the polyurethane film comprising graphene, another consists of a film not comprising graphene, and the release paper used for preparing the polyurethane film comprising graphene has a particular surface finish, which can transfer to the film comprising graphene a particular aesthetic appearance, for example opaque black, defined as carbon look.

The following examples illustrate some embodiments of the invention and are provided by way of non-limiting example.

EXAMPLES

Example 1

Preparation of a Polyurethane Monolayer Film
Step (A)
100 kg of polyurethane resin (ICAFLEX BR447 MATT3) are placed in a vessel provided with a mechanical stirrer (Dissolver DISPERMAT® CN100, diameter of heavy duty disc 350 mm) and the rotation speed is adjusted to 200 r.p.m. The following are then added:
  5 kg of G+ graphene powder marketed by Directa Plus SpA, consisting of nano-platelets having a lateral dimension of 1 to 7 μm, a thickness of 0.34 to 4 nm, and a C/O ratio >100

0.8 kg of silica (OK 500)
2.7 kg of isocyanate catalyst (TRIXENE DP9B1376)
0.5 kg of flow additive (ADITEX LA 77)

Step (B)

A solvent consisting of dipropylene glycol methyl ether marketed under the brand Dowanol® DPM by Dow Chemical is added to the composition of Step (A) and the viscosity is brought to the range 6,000-10,000 cPs. The mixture is stirred at 1000 r.p.m. for 1.5 hours.

Step (C)

In a coating line as shown in FIG. 1 the polyurethane composition formed in step (C) is uniformly applied on a roll of release paper (S/K VEZ Matte, SAPPI) by means of a pneumatic pump that withdraws the composition from the stirred vessel. The roll of release paper is fed forward at a speed of 10 m/min. The thickness of the polyurethane film is set to 20 μm by adjusting the gap between the paper and the blade 14.

Step (D)

The paper tape on which the layer of polyurethane composition with thickness of 20 μm has been deposited is placed in the oven 16 and heated to an increasing temperature between 40 and 160° C., with formation of a polyurethane film.

Step (E)

At the outlet of the oven 16 a flap of polyurethane film is detached by hand, and then attached to a cylinder to be wound. Also the release paper is wound on a cylinder and separated from the film. At the system outlet a check is performed on the uniformity of the weight between centre and edges by weighing a 100 cm² disc with 0.001 precision balance.

The film has a graphene content of approximately 5% by weight and a silica content of approximately 0.8% by weight.

Characterization of the Film Formed
Breathability: RET <10 m² Pa/W (ISO 31092,)
Impermeability: >1500 mm (ISO 20811)
Abrasion resistance: >5000 cycles (ISO 12947)
Surface resistivity: 7000Ω/γ (JIS K 7194 standard)
In-plane thermal conductivity: 3.213 W/mK (ISO 22007-2)
IR absorbance: Absorption >90%
Antibacterial properties: Bacteriostatic on both gram positive and gram negative bacteria (UNI EN ISO 20743: 2013)

The surface resistivity is a parameter that characterizes the electrical conduction properties, for two-dimensional or almost two-dimensional samples, i.e. having thickness much smaller than the width and the length. The surface resistivity is defined as the ratio between the electrical resistivity and the thickness. The electrical resistivity is the reciprocal of the electrical conductivity.

Example 2

Preparation of a Two-Layer Film of Polyurethane and PTFE

Steps (A) to (D) are performed as in Example 1, the only difference being that in Step (A) the amount of graphene is 3 kg and the amount of silica is 0.5 kg.

The film obtained has a graphene content of approximately 3% by weight and a silica content of approximately 0.5% by weight.

At the outlet of the oven 16 a roll of a film 18 of PTFE without graphene (MS-2020, Membrane Solutions), thickness 25 μm, is positioned on a support. The PTFE film 18 is placed over and laid on the polyurethane film coming from the oven 16. The bond consisting of the release paper+polyurethane film comprising graphene+PTFE film 18 is passed through a calender 20 (step $D_1$) and then sent to a second oven where it is heated to a temperature of 160° C. (step $D_2$).

At the outlet of the oven 22 the release paper is separated and wound on a roll 10', while the two-layer film 24 consisting of the polyurethane film comprising graphene and the PTFE film coupled to it is wound on a tape 26 (step E).

At the system outlet the uniformity of the weight between centre and edges is checked (a 100 cm² disc is weighed with 0.001 precision balance).

Characterization of the Two-Layer Film Formed
Breathability: RET <7 (method RET, ISO 31092, m² Pa/W)
Impermeability: >20000 mm (ISO 20811)
Abrasion resistance: >45000 cycles (ISO 12947)
Surface resistivity: 43000Ω/□ (JIS K 7194 standard)
Thermal in-plane conductivity: 2.404 W/mK (ISO 22007-2)
IR absorbance: Absorbance >90%
Antibacterial properties: Bacteriostatic on both gram positive and gram negative bacteria (UNI EN ISO 20743: 2013)

Example 3

Preparation of a Polyurethane Two-Layer Film

The operating procedure is the same as in Example 2, with the following differences:
in Step (A) the amount of graphene is 10 kg, the amount of silica is 1.3 kg and the polyurethane resin WITCO-FLEX 886 MATT was used.

At the outlet of the oven 16 the polyurethane film containing graphene, which has a graphene content of approximately 10% by weight and silica content of approximately 1.3% by weight, is coupled not with a PTFE film but with another polyurethane film without graphene, having thickness of 20 μm.

The other aspects of the procedure are as described in Example 2.

Characterization of the Two-Layer Film Formed
Breathability: RET <25 (method RET, ISO 31092, m² Pa/W)
Impermeability: >10000 mm (ISO 20811)
Abrasion resistance: >50000 cycles (ISO 12947)
Surface resistivity: 834Ω/γ (JIS K 7194 standard)
In-plane thermal conductivity: 6.285 W/mK (ISO 22007-2)
IR absorbance: Absorption >90%
Antibacterial properties: Bacteriostatic on both gram positive and gram negative bacteria (UNI EN ISO 20743: 2013)

Example 4

Preparation of a Thermoadhesive Tape Comprising a Two-Layer Polyurethane Film

The operating procedure is the same as in Example 3, the only difference being that the release paper is not separated from the two-layer polyurethane film.

The bond consisting of the two polyurethane films and the release paper is positioned at the beginning of the system and, on the polyurethane film not comprising graphene, a thermoadhesive material (TERMOFIX s 373) is applied, following the procedure of step (C).

The other steps of the procedure are then performed as in Example 3. The three-layer film thus produced is then sliced with an appropriate blade to create thermoadhesive tapes with width of 2 cm.

Example 5

Preparation of a Two-Layer Polyurethane Film with Carbon Look Finish

Step (A)

100 kg of polyurethane resin (Texane SP 162 RB, TWS) are placed in a vessel provided with mechanical stirrer (Dissolver DISPERMAT® CN100, diameter of heavy duty disc 350 mm) and the rotation speed is adjusted to 500 r.p.m. The following are then added:

- 15 kg of graphene powder G+ sold by Directa Plus SpA, as per Example 1
- 0.5 kg of silica (OK 500)
- 3 kg of isocyanate catalyst (Texane D3)
- 2 kg of melamine catalyst (Texane M2)
- 1.5 kg of accelerator (Texane B5)
- 0.7 kg of flow additive (ADITEX LA 77)

Step (B)

A solvent consisting of dimethyl formamide is added to the composition of Step (A) and the viscosity is brought to the range 6,000-10,000 cPs. The mixture is stirred at 2000 r.p.m. for 2 hours.

Step (C)

In a coating system as in FIG. 1 the polyurethane composition formed in step (C) is uniformly applied on a roll of textured release paper (ULTRACAST, SAPPI) by means of a pneumatic pump which takes the composition from the stirred vessel. The roll of release paper is fed forward at a speed of 10 m/min. The thickness of the polyurethane film is set to 30 μm by adjusting the gap between the paper and the blade 14.

The film obtained has a graphene content of approximately 15% by weight and a silica content of approximately 0.5% by weight.

Step (D)

The textured release paper tape on which the layer of polyurethane composition having thickness of 30 μm has been deposited is placed in the oven 16 and heated to an increasing temperature between 40 and 160° C., with formation of a polyurethane film.

Steps ($D_1$) and ($D_2$) of the Process

At the outlet of the oven 16 a roll of a polyurethane film 18 without graphene having thickness of 20 μm is positioned on a support. The film 18 is placed over and laid on the polyurethane film coming from the oven 16. The bond consisting of the textured release paper+polyurethane film comprising graphene+polyurethane film not comprising graphene 18 is passed through a calender 20 and then sent to a second oven 22, where it is heated to a temperature of 160° C.

Step (E)

At the outlet of the oven 22 the textured release paper is separated and wound in a roll 10', while the two-layer film 24 consisting of the polyurethane film comprising graphene and the polyurethane film coupled to it is wound on a tape 26.

At the system outlet the uniformity of the weight between centre and edges is checked (a 100 cm² disc is weighed with 0.001 precision balance).

The layer consisting of the polyurethane film comprising graphene has a carbon look finish.

Characterization of the Two-Layer Film Formed

Breathability: not breathable
Impermeability: >10000 mm (ISO 20811)
Abrasion resistance: >50000 cycles (ISO 12947)
Surface resistivity: 170Ω/γ (JIS K 7194 standard)
In-plane thermal conductivity: 8.082 W/mK (ISO 22007-2)
IR absorbance: Absorption >90%
Antibacterial properties: Bacteriostatic on both gram positive and gram negative bacteria (UNI EN ISO 20743: 2013)

Example 6 (Comparison)

Preparation of a Monolayer Polyurethane Film without Graphene

Example 1 was repeated without using graphene.

Characterization of the Film Formed

Breathability: RET <7 (method RET, ISO 31092, m² Pa/W)
Impermeability: >10000 mm (ISO 20811)
Abrasion resistance: >20000 cycles (ISO 12947)
Surface resistivity: non conductive—non measurable (JIS K 7194 standard)
In-plane thermal conductivity: 0.023 W/mK (ISO 22007-2)
IR absorbance: <10%
Antibacterial properties: Non bacteriostatic (UNI EN ISO 20743:2013)

From the preceding description and from the examples, it is demonstrated that the use of grapheme nano-platelets having the characteristics defined in the present invention represents an effective tool for improving the characteristics of polyurethane film and membranes. In particular it is possible to:

- considerably improve the thermal conductivity of the film, in order to provide and exploit a planar thermal circuit to dissipate the heat and therefore increase the level of comfort of the item of clothing—in the case of film used in the clothing sector—or the performance level of the device incorporating the film;
- improve and modulate the electrical conductivity to achieve various performances of the film comprising antistatic effect (surface resistivity between $10^{10}$ and $10^5$ Ohm), heating and conducting effect (surface resistivity between $10^4$ and 10) and increase in absorption of infrared radiation to increase the insulating power of the film;
- give the film bacteriostatic properties.

On the other hand, the examples demonstrate that the graphene has a negative impact on breathability (increases the RET) and on impermeability.

The invention claimed is:

1. A polyurethane film comprising a polyurethane resin and graphene, said graphene present in an amount of from 1% to 30% by weight of the polyurethane film, and said graphene consisting essentially of graphene nano-platelets, with at least 90% of the graphene nano-platelets having a lateral dimension of from about 50 nm to 50000 nm and a thickness of from about 0.34 nm to 50 nm, and with the lateral dimension greater than the thickness and a C/O ratio ≥100:1.

2. The polyurethane film of claim 1, further comprising from 0.1% to 5% by weight on the total weight of the polyurethane film of an antiblocking additive.

3. The polyurethane film of claim 1, further comprising at least two coupled layers, one of which is a film not comprising graphene.

4. The polyurethane film of claim 1, wherein the C/O ratio of said graphene nano-platelets is ≥200:1.

5. The polyurethane film of claim 1, wherein at least 90% of said graphene nano-platelets' lateral dimension is from 100 nm to 25000 nm and thickness from 0.34 nm to 20 nm.

6. The polyurethane film of claim 5, wherein at least 90% of said graphene nano-platelets' lateral dimension is from 500 nm to 15000 nm and thickness from 0.34 nm to 8 nm.

7. The polyurethane film of claim 1, wherein said graphene is present in an amount of from 2% to 25% by weight on the total weight of the polyurethane film.

8. The polyurethane film of claim 7, wherein said graphene is present in an amount of from 3% to 15% by weight on the total weight of the polyurethane film.

9. The polyurethane film of claim 2, wherein said antiblocking additive is selected from silica, silicone, and kaolin.

10. A method for the preparation of a polyurethane film comprising graphene, comprising the steps of:
   a) preparing a composition comprising:
   a1) a polyurethane resin or precursors thereof,
   a2) from 0.1% to 5% by weight of an antiblocking additive,
   a3) from 1% to 30% by weight of graphene consisting essentially of graphene nano-platelets, with at least 90% of the graphene nano-platelets having a lateral dimension of from about 50 nm to 50000 nm and a thickness of from about 0.34 nm to 50 nm, and with the lateral dimension greater than the thickness and a C/O ratio ≥100:1;
   (b) adjusting the viscosity of the composition of step (a) with a solvent to from about 4000 cPs to 15000 cPs;
   (c) applying the composition of step (b) to a flat support until a layer having a thickness of from about 10 μm to 100 μm is formed;
   (d) heating said layer at an increasing temperature of from about 30° C. to 180° C., whereby a polyurethane film is formed; and
   (e) detaching said polyurethane film from said support.

11. The method of claim 10, further comprising step (d1) following said step (d), in which the polyurethane film is coupled with another film not comprising graphene by passing through a calender, and step (d2) in which the two coupled films are heated at an increasing temperature between 30° C. and 180° C. to form a multilayer film.

12. The method of claim 11, wherein said film not comprising graphene is selected from the group consisting of polytetrafluoroethylene (PTFE), thermoplastic polyurethane (TPU), polyolefins, polyamides, and polyester.

13. The method of claim 10, wherein said antiblocking additive is selected from silica, silicone, and kaolin.

14. The method of claim 10, wherein said flat support used in said step (c) consists essentially of non-adhesive paper, optionally provided with a surface finish on the side on which said composition is applied.

15. A polyurethane film formed according to claim 10.

* * * * *